United States Patent [19]

Morgan

[11] 4,348,515

[45] Sep. 7, 1982

[54] HEAT ACTIVATED THIURAM CONTAINING CURABLE COMPOSITIONS

[75] Inventor: Charles R. Morgan, Brookeville, Md.

[73] Assignee: W. R. Grace & Co., New York, N.Y.

[21] Appl. No.: 187,874

[22] Filed: Sep. 17, 1980

[51] Int. Cl.$^3$ .................. C08G 75/00; C08J 9/28; C08K 5/43
[52] U.S. Cl. .................. 526/204; 252/188.3 R; 528/392; 528/375; 564/76; 528/390; 526/214; 526/220; 526/223; 526/224
[58] Field of Search .................. 564/76; 528/390, 392; 252/188.3 R

[56] References Cited

U.S. PATENT DOCUMENTS

| | | | |
|---|---|---|---|
| 2,380,402 | 7/1945 | Browning | 528/390 |
| 3,852,354 | 12/1974 | Usamoto et al. | 564/76 |
| 3,888,964 | 6/1975 | Bain et al. | 528/390 |
| 4,144,272 | 3/1979 | Borgomi | 564/76 |

*Primary Examiner*—Irwin Gluck
*Attorney, Agent, or Firm*—Richard P. Plunkett; William W. McDowell, Jr.

[57] ABSTRACT

This invention relates to a heat curing process and to heat activated compositions comprising
(1) an ethylenically unsaturated compound containing at least two carbon-to-carbon double bonds and
(2) a thiuram.

6 Claims, No Drawings

HEAT ACTIVATED THIURAM CONTAINING CURABLE COMPOSITIONS

This invention is directed to a heat curing process and heat activated compositions. More particularly, this invention relates to heat activated compositions comprising compounds containing at least two carbon-to-cabon double bonds and a thiuram.

BACKGROUND OF THE INVENTION

It is known that tetramethyl thiuram disulfide acts as a free radical initiator for styrene polymerization. See Eur. Polym. J. 1971, 7(6), 717-26. It is also known that tetramethyl thiuram disulfide has been used as a polymerization initiator with methyl methacrylate and styrene monomers at 70 deg. C. The percent conversion was below 7% in all cases. See Journal of American Chemical Society, "Organic Disulfides as Initiators of Polymerization: Tetramethyl Thiuram Disulfide" by T. E. Ferington and A. V. Tobolsky, Volume 77, pgs. 4510–4512, 1955. Tetramethyl thiuram disulfide was also employed in the thermal polymerization at 95 deg. C. of acrylonitrile, methacrylonitrile, methyl acrylate, methyl methacrylate and styrene. See Journal of American Chemical Society, entitled "Some Sulfur Compounds as Polymerization Sensitizers", R. J. Kern, 1954. It is also known that organic polysulfides can be used as both thermal and photopolymerization catalyst for styrene monomer. See letters to the editor, Journal of Polymer Science, Volume XXI, Issue Number 99 (1956), pgs. 559–561. In all of the above reactions the resultant material is a chain-extended polymer and does not contain a crosslinked structure.

One object of the instant invention is to produce a composition which on exposure to heat results in a cured (crosslinked) solid product. Another object of the instant invention is to produce a composition which can be heat-cured. Other objects will become obvious from a reading hereinafter.

DETAILED DESCRIPTION OF THE PRESENT INVENTION

This invention relates to a heat curing process and to heat activated compositions comprising (1) an ethylenically unsaturated compound containing at least two carbon-to-carbon double bonds, hereinafter sometimes referred to as a polyene, and (2) a thiuram of the formula

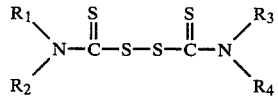

wherein $R_1$, $R_2$, $R_3$ and $R_4$ taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having from 6 to about 12 ring carbon atoms, aralkyl having from 6 to about 12 ring carbon atoms and, when taken together, $R_1$ and $R_2$ and $R_3$ and $R_4$ can each be a divalent alkylene group $(C_nH_{2n-2})$ having from 2 to about 12 carbon atoms, a divalent alkenylene group $(C_nH_{2n-2})$ group having from 3 to about 10 carbon atoms, a divalent alkadienylene group $(C_nH_{2n-4})$ having from 5 to about 10 carbon atoms, a divalent alkatrienylene group $(C_nH_{2n-6})$ having from 5 to about 10 carbon atoms, a divalent alkyleneoxyalkylene group $(-C_xH_{2x}-OC_xH_{2x}-)$ having a total of from 4 to about 12 carbon atoms or a divalent alkyleneaminoalkylene group

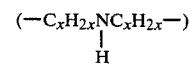

having a total of from 4 to about 12 carbon atoms.

Operable thiurams include, but are not limited to, tetramethylthiuram disulfide, tetraethylthiuram disulfide, di-N-pentamethylenethiuram disulfide, tetrabutylthiuram disulfide, diphenyldimethylthiuram disulfide, diphenyldiethylthiuram disulfide and diethyleneoxythiuram disulfide and the like.

The thiuram is added to the composition in an amount ranging from 0.005-5.0% by weight of the ethylenically unsaturated compound.

Although the aforesaid compositions, per se, are operable herein to form useful products, they may also be used in combination with conventional copolymerizable monomeric compounds or reactive diluents. The admixture of the composition of the instant invention with other monomers is employed usually to control viscosity and other application variables such as rate of cure as well as final film properties such as hardness and flexibility. These reactive diluents cocure with the ethylenically unsaturated compound on exposure to heat. Examples of conventional copolymerizable compounds useful as reactive diluents include, but are not limited to, monofunctional acrylic esters, monofunctional methacrylic esters, styrene, vinyl-toluene, acrylonitrile, methacrylonitrile, vinyl chloride, vinylidene chloride, butadiene, isoprene, chloroprene, divinyl benzene, di(-vinyl-phenyl) carbonate, diallyl phthalate, diallyl carbonate, di-(allylphenyl) carbonate, diallyl furmarate, triallyl isocyanurate, triallyl cyanurate, diallyl chlorendate, diallyl maleate and unsaturated polyesters and mixtures thereof. By the term unsaturated polyesters herein is meant the usual polycondensation products which consist of ester-like linked residues of polyvalent, especially divalent, alcohols, as well as possibly also residues of monovalent alcohols and/or of monovalent carboxylic acids, whereby the residues must contain at least partially unsaturated groups. Examples of acids include maleic acid, fumaric acid, itaconic acid, mesaconic acid, citraconic acid, succinic acid, glutaric acid, adipic acid, phthalic acid, tetrachlorophthalic acid, hexachloroendomethylenetrahydrophthalic acid, trimellitic acid, benzoic acid, linseed oil fatty acid and ricinoleic fatty acid and mixtures thereof. Examples of alcohols include ethylene glycol, diethylene glycol, propane, butane and hexane diols, trimethylolpropane, pentaerythritol, butanol and tetrahydrofurfuryl alcohol.

The reactive diluents can be added to the system in amounts ranging up to 90% by weight of the ethylenically unsaturated compound, preferably 20 to 50% by weight on the same basis.

The compositions of the present invention may, if desired, include such additives as antioxidants, dyes, inhibitors, fillers, pigments, antistatic agents, flame-retardant agents, thickeners, thixotropic agents, surface-active agents, viscosity modifiers, extending oils, plasticizers, tackifiers and the like within the scope of this invention. Such additives are usually preblended with the ethylenically unsaturated compound prior to or during the compounding step. Operable fillers include natural and synthetic resins, glass fibers, wood flour, clay, silica, alumina, carbonates, oxides, hydroxides, silicates, glass flakes, borates, phosphates, diatomaceous earth, talc, kaolin, barium sulfate, calcium sulfate, calcium carbonate, antimony oxide and the like. The aforesaid additives may be present in quantities up to 500 parts or more per 100 parts of the ethylenically unsaturated compound by weight and preferably about 0.005 to about 300 parts on the same basis.

In practicing the instant invention it is sometimes desirable to add a polythiol to the composition prior to curing. This is especially true when the ethylenic unsaturation is an allylic group. In this case the polythiol adds across the double bond of the allylic group resulting in solid cured materials in a commercially acceptable time period. In the instance where the ethylenic unsaturation in the polyene is an acrylic or methacrylic group, the addition of a polythiol to the system precludes the formation of a tacky surface due to air inhibition.

As used herein, the term polythiols refers to simple or complex organic compounds having a multiplicity of pendant or terminally positioned -SH functional groups per average molecule.

On the average the polythiols must contain 2 or more -SH groups/molecule and usually have a viscosity range of slightly above 0 to 20 million centipoises (cps) at 70 deg. C., as measured by a Brookfield Viscometer. Included in the term "polythiols" as used herein are those materials which in the presence of an inert solvent, aqueous dispersion or plasticizer fall within the viscosity range set out above at 70 deg. C. Operable polythiols in the instant invention usually have molecular weights in the range 94–20,000, preferably 100–10,000.

The polythiols operable in the instant invention can be exemplified by the general formula: $R_8\text{-}(SH)_n$ where n is at least 2 and $R_8$ is a polyvalent organic moiety free from reactive carbon-to-carbon unsaturation. Thus, $R_8$ may contain cyclic groupings and minor amounts of hetero atoms such as N, S, P or O but primarily contains carbon-hydrogen, carbon-oxygen or silicon-oxygen containing chain linkages free of any reactive carbon-to-carbon unsaturation.

One class of polythiols operable with polyenes in the instant invention to obtain essentially odorless polythioether products are esters of thiol-containing acids of the general formula $HS\text{-}R_9\text{-}COOH$, where $R_9$ is an organic moiety containing no "reactive" carbon-to-carbon unsaturation, with polyhydroxy compounds of the general structure $R_{10}\text{-}(OH)_n$, where $R_{10}$ is an organic moiety containing no "reactive" carbon-to-carbon unsaturation and n is 2 or greater. These components will react under suitable conditions to give a polythiol having the general structure

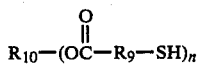

wherein $R_9$ and $R_{10}$ are organic moieties containing no "reactive" carbon-to-carbon unsaturation and n is 2 or greater.

Certain polythiols such as the aliphatic monomeric polythiols (ethane dithiol, hexamethylene dithiol, decamethylene dithiol, tolylene-2,4-dithiol, etc.), and some polymeric polythiols such as a thiol-terminated ethylcyclohexyl dimercaptan polymer, etc., and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low odor level include, but are not limited to, esters of thioglycolic acid ($HS\text{-}CH_2COOH$), alpha-mercaptopropionic acid ($HS\text{-}CH(CH_3)\text{-}COOH$) and beta-mercaptopropionic acid ($HS\text{-}CH_2CH_2COCH$) with polyhydroxy compounds such as glycols, triols, tetraols, pentaols, hexaols, etc. Specific examples of the preferred polythiols include, but are not limited to, ethylene glycol bis (thioglycolate), ethylene glycol bis (beta-mercaptopropionate, trimethylolpropane tris(thioglycolate), trimethylolpropane tris(beta-mercaptopropionate), pentaerythritol tetrakis(thioglycolate) and pentaerythritol tetrakis(beta-mercaptopropionate), all of which are commercially available. A specific example of a preferred polymeric polythiol is polypropylene ether glycol bis(beta-mercaptopropionate) which is prepared from polypropylene ether glycol (e.g., Pluracol P2010, Wyandotte Chemical Corp.) and beta-mercaptopropionic acid by esterification.

Additionally, polythiols operable herein to give cured solid polythioether products with the polyene in the presence of a free radical generator include the mercaptoester derivatives of styrene-allyl alcohol copolymers set out in U.S. Pat. No. 3,904,499 and the isocyanurate containing polytriols disclosed in U.S. Pat. No. 3,676,440 and liquid thiol-terminated polymers made in accord with U.S. Pat. No. 3,258,495, all incorporated hereby by reference.

The preferred polythiol compounds are characterized by a low level of mercaptan-like odor initially and, after reaction, give essentially odorless polythioether end products which are commercially attractive and practically useful resins or elastomers for both indoor and outdoor applications.

Prior to curing, the polyene and polythiol components are admixed in a suitable manner so as to form a homogeneous liquid curable mixture. Thus, the polyene and polythiol reactants can be admixed without the necessity of using a solvent at room temperature or slightly elevated temperatures up to about 80 deg. C. when one of the components is a solid or, if desired, the reactants may be dissolved in a suitable solvent and, thereafter, the solvent can be removed by suitable means such as evaporation.

The curing reaction is carried out at a temperature in the range 100–250 deg. C., preferably 115–175 deg. C.

The following examples will explain, but expressly not limit, the instant invention. Unless otherwise noted, all parts and percentages are by weight.

EXAMPLE 1

Dipentamethylenethiuram disulfide, commercially available from Pfaltz & Bauer, Inc., was recrystallized from boiling chloroform, then precipitated out of a chloroform solution with ethanol and then air dried. This material will hereinafter be referred to as Thiuram-A.

EXAMPLE 2

Tetramethylthiuram disulfide, commercially available from Aldrich Chemical Co., was recrystallized twice from boiling chloroform and then precipitated out of a chloroform solution with ethanol and air dried. This recrystallized material will hereinafter be referred to as Thiuram-B.

EXAMPLE 3

20 g of commercially available hexanediol diacrylate was admixed with 0.02 g of Thiuram-A. Formulation was heated with stirring in a 30 ml beaker to 146–150 deg. C. whereupon it changed from a liquid to a solid state. A control sample without Thiuram-A present remained liquid at this temperature.

EXAMPLE 4

20 g of commercially available hexenediol diacrylate was admixed with 0.2 g of Thiuram-B. The formulation was heated in a 30 ml beaker to 120 deg. C. whereupon the formulation cured to a solid with an exotherm of greater than 200 deg. C. A control sample treated in the same manner without any Thiuram-B remained liquid.

EXAMPLE 5

To a 3,000 ml resin kettle equipped with stirrer, thermometer, nitrogen inlet and outlet and vented addition funnel was charged under a nitrogen blanket 959.4 g of commerically available trimethylolpropane diallyl ether and 0.95 g of stannous octaoate catalyst. 1,000 g of commerically available isophorone diisocyanate was charged to the addition funnel and added dropwise to the kettle with stirring over a 4½ hour period while maintaining the temperature below 70 deg. C. After the isophorone diisocyanate was completely added, the temperature was allowed to drop to room temperature (24 deg. C.), the nitrogen blanket discontinued and the reaction was stirred for 48 hours.

To a separate 1,000 ml resin kettle equipped with stirrer, thermometer, nitrogen inlet and outlet and vented addition funnel was charged 597 g of the reaction product from above along with 16 drops of stannous octoate. 138 g of commerically available N,N'-bis(2-hydroxyethyl) dimethylhydantoin was charged to the addition funnel and, thereafter, added dropwise to the resin kettle with stirring while maintaining the temperature below 70 deg. C. The resultant polyene product of the formula:

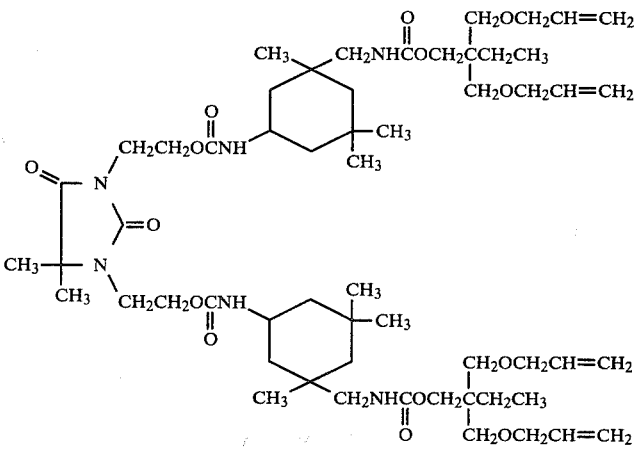

had a glass melting point of 95 deg. C.; unsaturation: theory, 3.66 mmoles/g; found, 3.78 mmoles/g. This polyene prepolymer will hereinafter be referred to as Polyene A.

EXAMPLE 6

6.0 g of Polyene-A from Example 5 were admixed with 8.3 g of commercially available pentaerythritol tetrakis mercaptopropionate, 5.5 g of triallyl isocyanurate and 0.02 g of Thiuram-A from Example 1. The admixture was heated with stirring in a 30 ml beaker to 146–150 deg. C. whereupon the mixture changed from a liquid to the solid state. A control sample treated in the same manner but without Thiuram-A added remained liquid under the same conditions.

EXAMPLE 7

13.2 g of commercially available hexanediol diacrylate, 6.6 g of commercially available pentaerythritol tetrakis(3-mercaptopropionate) and 0.02 g of Thiuram-A from Example 1 were admixed in a 30 mil beaker. The beaker was heated with stirring to 146–150 deg. C. whereupon the liquid admixture formed a solid. A control sample without any Thiuram-A present remained liquid under the same conditions.

I claim:
1. A heat activated composition comprising
   (1) an ethylenically unsaturated compound containing at least 2 carbon-to-carbon double bonds and
   (2) a thiuram.
2. The composition of claim 1 wherein the thiuram is of the formula

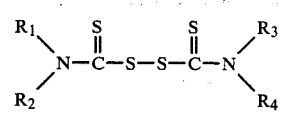

wherein $R_1$, $R_2$, $R_3$ and $R_4$ taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having from 6 to about 12 ring carbon atoms, alkaryl having from 6 to about 12 ring carbon atoms and, when taken together, $R_1$ and $R_2$ and $R_3$ and $R_4$ can each be a divalent alkylene group ($-C_nH_{2n}-$) having from 2 to about 12 carbon atoms, a divalent alkenylene group ($C_nH_{2n-2}$) group having from 3 to about 10 carbon atoms, a divalent alkadienylene group —$(C_nH_{2n-4})$— having from 5 to about 10 carbon atoms, a divalent alkatrienylene group —$(C_nH_{2n-6})$— having from 5 to about 10 carbon atoms, a divalent alkyleneoxyalkylene group (—$C_xH_{2x}$-$OC_xH_{2x}$—) having a total of from 4 to about 12 carbon atoms or a divalent alkyleneaminoalkylene group

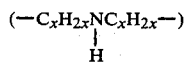

having a total of from 4 to about 12 carbon atoms.

3. The composition according to claim 1 containing in addition a polythiol.

4. The process of curing an ethylenically unsaturated compound which comprises admixing an ethylenically unsaturated compound containing at least 2 carbon-to-carbon double bonds and a thiuram and thereafter heating said composition to a temperature in the range 100 deg.–250 deg. C.

5. The process according to claim 4 wherein the thiuram has the formula:

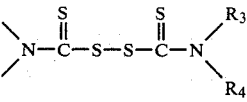

wherein $R_1$, $R_2$, $R_3$ and $R_4$ taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having from 6 to about 12 ring carbon atoms, aralkyl having from 6 to about 12 ring carbon atoms and, when taken together, $R_1$ and $R_2$ and $R_3$ and $R_4$ can each be a divalent alkylene group (—$C_nH_{2n}$—) having from 2 to about 12 carbon atoms, a divalent alkenylene group ($C_nH_{2n-2}$) group having from 3 to about 10 carbon atoms, a divalent alkadienylene group —$(C_nH_{2n-4})$— having from 5 to about 10 carbon atoms, a divalent alkatrienylene group —$(C_nH_{2n-6})$— having from 5 to about 10 carbon atoms, a divalent alkyleneoxyalkylene group (—$C_xH_{2x}$-$OC_xH_{2x}$—) having a total of from 4 to about 12 carbon atoms or a divalent alkyleneaminoalkylene group

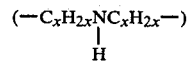

having a total of from 4 to about 12 carbon atoms.

6. The process according to claim 4 wherein the composition also contains a polythiol.

* * * * *

UNITED STATES PATENT AND TRADEMARK OFFICE
CERTIFICATE OF CORRECTION

PATENT NO. : 4,348,515

DATED : September 7, 1982

INVENTOR(S) : Charles R. Morgan

It is certified that error appears in the above-identified patent and that said Letters Patent are hereby corrected as shown below:

In column 6, line 42, delete "alkaryl" and insert therefor --aralkyl--.

Signed and Sealed this

Seventeenth Day of May 1983

[SEAL]

Attest:

DONALD J. QUIGG

Attesting Officer

Acting Commissioner of Patents and Trademarks